(12) United States Patent
Ahmed et al.

(10) Patent No.: US 11,707,708 B2
(45) Date of Patent: Jul. 25, 2023

(54) SYSTEMS AND METHODS FOR CAPTURING CARBON DIOXIDE

(71) Applicant: Saudi Arabian Oil Company, Dhahran (SA)

(72) Inventors: Zeyad Tareq Ahmed, Chassess, MI (US); Serguey Viktorov Arkadakskiy, Alberta (CA); Noushad Kunnummal, Louisville, KY (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/502,364

(22) Filed: Oct. 15, 2021

(65) Prior Publication Data
US 2022/0288526 A1 Sep. 15, 2022

Related U.S. Application Data

(60) Provisional application No. 63/160,038, filed on Mar. 12, 2021.

(51) Int. Cl.
*B01D 53/00* (2006.01)
*B01D 53/14* (2006.01)
(Continued)

(52) U.S. Cl.
CPC ....... *B01D 53/1406* (2013.01); *B01D 53/047* (2013.01); *B01D 53/0462* (2013.01);
(Continued)

(58) Field of Classification Search
CPC ............ B01D 53/1406; B01D 53/1493; B01D 53/047; B01D 53/0462; B01D 53/1475; B01D 53/141; B01D 53/1437
See application file for complete search history.

(56) References Cited

U.S. PATENT DOCUMENTS

2011/0226989 A9 9/2011 Seeker et al.
2013/0327983 A1* 12/2013 Blair .................. B01D 53/1493
252/184
(Continued)

FOREIGN PATENT DOCUMENTS

WO 2011011740 A1 1/2011

OTHER PUBLICATIONS

Snaebsbjornsdittier et al. "Carbon dioxide storage through mineral carbonation", www.nature.com/natrevearthenviron, Jan. 20, 2020, 13 pgs.
(Continued)

*Primary Examiner* — Sharon Pregler
(74) *Attorney, Agent, or Firm* — Dinsmore & Shohl LLP

(57) ABSTRACT

A method for capturing carbon dioxide includes contacting a carbon dioxide lean gas mixture with water. One or more acid gas impurities may pass from the carbon dioxide lean gas mixture to the water to form a gas mixture and an aqueous effluent. The gas mixture is passed to a pressure swing adsorption system or a temperature swing adsorption system to increase a concentration of carbon dioxide in the gas mixture to form a carbon dioxide enriched gas mixture. The carbon dioxide enriched gas mixture is contacted with the aqueous effluent in a carbon dioxide scrubber. Carbon dioxide passes from the carbon dioxide enriched gas mixture to the aqueous effluent to form a stripped gas and acid gas enriched water. The acid gas enriched water is passed to a reactive rock formation. The one or more acid gas impurities and carbon dioxide are mineralized and permanently sequestered.

20 Claims, 1 Drawing Sheet

(51) Int. Cl.
  *B01D 53/047* (2006.01)
  *B01D 53/04* (2006.01)

(52) U.S. Cl.
  CPC ..... *B01D 53/1437* (2013.01); *B01D 53/1468* (2013.01); *B01D 53/1475* (2013.01); *B01D 53/1481* (2013.01); *B01D 53/1493* (2013.01); *B01D 2252/103* (2013.01); *B01D 2253/102* (2013.01); *B01D 2253/108* (2013.01); *B01D 2253/204* (2013.01); *B01D 2257/504* (2013.01)

(56) References Cited

U.S. PATENT DOCUMENTS

2020/0316515 A1* 10/2020 Arkadakskiy .......... B01D 53/18
2020/0317513 A1  10/2020 Arkadakskiy et al.

OTHER PUBLICATIONS

Gunnarsson et al. "The rapid and cost-effective capture and sub-surface mineral storage of carbon and sulfur at the CarbFix2 site", Internal Journal of Greenhouse Gas Control 79 (2018) 117-126, 10 pgs.
Gislason et al. "A brief history of CarbFix: Challenges and victories of the project's pilot phase", Energy Procedia 146 (2018) 103-114, 12 pgs.

* cited by examiner

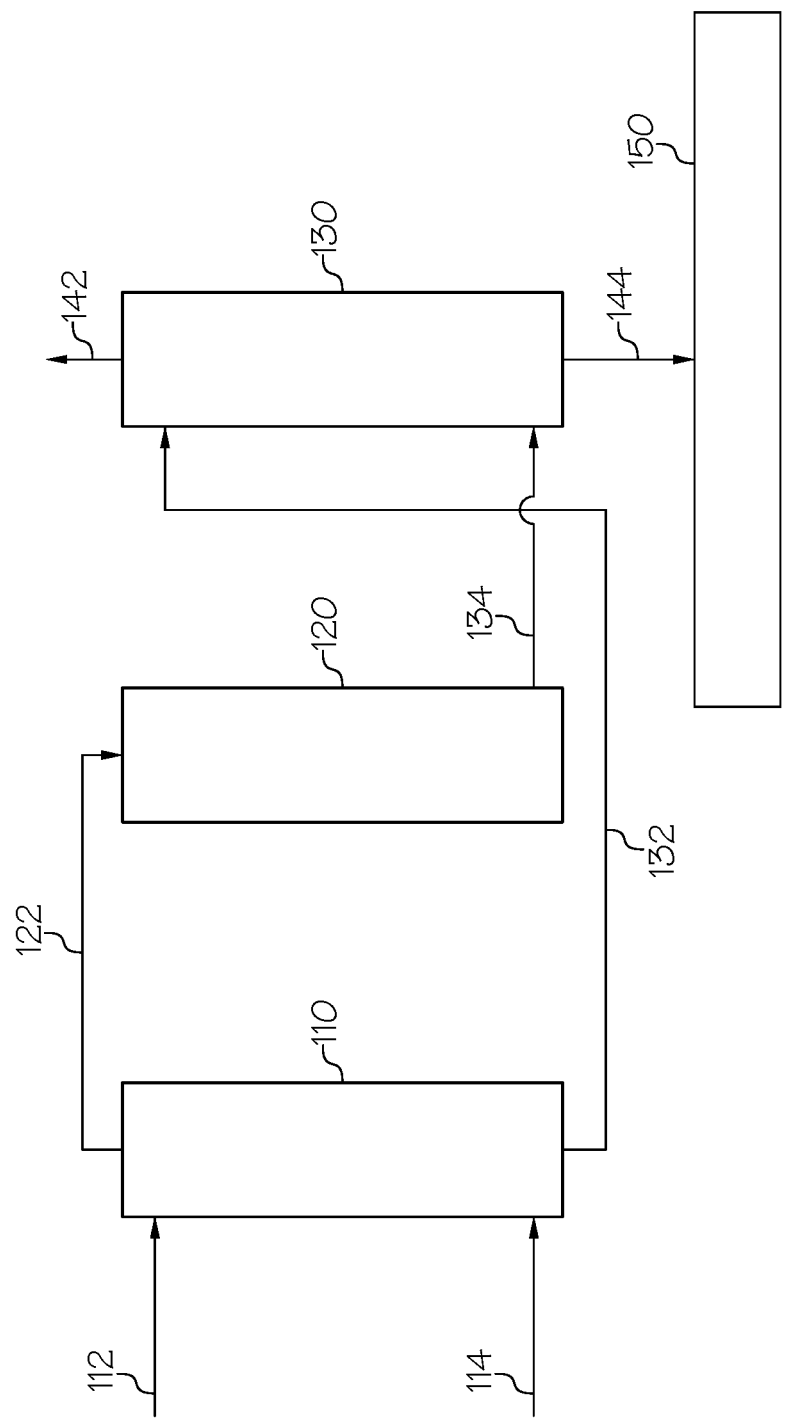

SYSTEMS AND METHODS FOR CAPTURING CARBON DIOXIDE

CROSS-REFERENCE TO RELATED APPLICATIONS

The present application claims the benefit of and priority to U.S. Provisional Application Ser. No. 63/160,038 filed on Mar. 12, 2021, the entire contents of which are incorporated by reference in the present disclosure.

TECHNICAL FIELD

Embodiments of the present disclosure generally relate to chemical processing and, more particularly, to systems and methods for capturing carbon dioxide.

BACKGROUND

Traditional carbon capture and storage often includes purifying carbon dioxide, liquefying the carbon dioxide, and injecting the liquid carbon dioxide into a deep sedimentary rock reservoir. These traditional carbon capture and storage techniques often require expensive purification steps such as cryogenic carbon capture or amine adsorption to produce nearly pure streams of carbon dioxide.

Safe and economic transportation, as well as the injection and long-term storage of carbon dioxide in conventional carbon capture and storage, depends upon carbon dioxide being compressed to a supercritical or liquid state. Consequently, underground carbon dioxide storage reservoirs are typically located at least about 850 vertical meters below the ground surface to ensure that there is sufficient pressure to keep carbon dioxide in a liquid state, adding to the cost of the injection and disposal wells. Since carbon dioxide in conventional carbon capture and storage could remain in a liquid and/or compressed gas state for hundreds or thousands of years, sophisticated long-term monitoring programs are needed to ensure that the carbon dioxide is truly confined to a given carbon capture and storage reservoir and does not migrate to overlying aquifers or the surface.

SUMMARY

An alternative to traditional carbon sequestration is the capture of carbon dioxide in the form of carbonic acid and its subsequent sequestration via mineral carbonation. Carbon dioxide, dissolved in water, may be injected into reactive rock formations, where the carbon dioxide may precipitate in the form of solid carbonates. However, this carbon sequestration technique requires the dissolution of carbon dioxide in water, in which carbon dioxide has a relatively low solubility. The low solubility of carbon dioxide in water may be problematic when capturing carbon from carbon dioxide lean sources, such as flue gas. Accordingly, there is a need for improved methods for capturing carbon dioxide from emissions and dissolving it in water efficiently for injection and sequestration via mineral carbonation.

Embodiments of the present disclosure address one or more of these problems and are directed to systems and methods for capturing carbon dioxide in reactive geological formations. According to some embodiments, carbon dioxide may be captured from carbon dioxide lean sources by concentrating the carbon dioxide and then dissolving the carbon dioxide in water for injection into reactive geological formations for sequestration. The carbon dioxide may be concentrated using pressure swing adsorption or temperature swing adsorption. Pressure swing adsorption and temperature swing adsorption utilize adsorbent materials that may be poisoned by various acid gasses, including hydrogen sulfide. Since hydrogen sulfide is often present in flue gas or other similar carbon dioxide lean waste gas sources, hydrogen sulfide and other acid gasses may be removed from the carbon dioxide lean gas stream in a scrubber upstream of the pressure swing adsorption or temperature swing adsorption equipment. According to one or more embodiments described herein, carbon dioxide may be captured from a carbon dioxide lean gas mixture by scrubbing the gas mixture to remove acid gas impurities, such as hydrogen sulfide, concentrating the carbon dioxide in the gas mixture by pressure swing adsorption or temperature swing adsorption, scrubbing at least a portion of the carbon dioxide from the gas mixture in a second scrubber and injecting the carbon dioxide dissolved in water into a reactive geological formations.

According to one or more embodiments, a method for capturing carbon dioxide may include contacting a carbon dioxide lean gas mixture with water. One or more acid gas impurities may pass from the carbon dioxide lean gas mixture to the water to form a gas mixture and an aqueous effluent. The method may include passing the gas mixture to a pressure swing adsorption system or a temperature swing adsorption system to increase a concentration of carbon dioxide in the gas mixture to form a carbon dioxide enriched gas mixture. The method may include contacting the carbon dioxide enriched gas mixture with the aqueous effluent in a carbon dioxide scrubber. Carbon dioxide may pass from the carbon dioxide enriched gas mixture to the aqueous effluent to form a stripped gas and acid gas enriched water. The method may include passing the acid gas enriched water to a reactive rock formation. The one or more acid gas impurities and carbon dioxide may be mineralized and thereby permanently sequestered.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

BRIEF SUMMARY OF THE DRAWINGS

The following detailed description of specific embodiments of the present disclosure can be best understood when read in conjunction with the following drawings, in which:

FIG. 1 schematically depicts a dual stage gas scrubbing system according to one or more embodiments described herein.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Described herein are systems and methods for capturing carbon dioxide and acid gasses from carbon dioxide lean gas mixtures. The methods may include the use of a dual stage gas scrubber. In one or more embodiments, the first scrubbing stage may remove acid gas impurities from the carbon dioxide lean gas mixture. There may be a pressure swing adsorption or temperature swing adsorption step to enrich the carbon dioxide in the gas mixture. Then, a second scrubbing stage may remove the enriched carbon dioxide from the gas mixture using the aqueous effluent from the first scrubbing stage. The aqueous effluent from the second scrubbing stage may be injected into a reactive geological formation to mineralize the carbon dioxide.

Referring now to FIG. 1, an embodiment of a system for scrubbing carbon dioxide from a gas mixture is depicted. As depicted in FIG. 1, a carbon dioxide lean gas mixture 114 may be passed to an acid gas scrubber 110. The carbon dioxide lean gas mixture 114 may comprise carbon dioxide ($CO_2$), hydrogen sulfide ($H_2S$), and sulfur dioxide ($SO_2$). The carbon dioxide lean gas mixture may further comprise nitrogen and hydrogen. In one or more embodiments, the carbon dioxide lean gas mixture 114 may be a flue gas or another carbon dioxide lean waste gas mixture. For example, the carbon dioxide lean waste gas mixture may be from a power plant, a steel plant, a refinery, a gas processing plant, or a cement plant. In one or more embodiments, the carbon dioxide lean gas mixture 114 may have a concentration of carbon dioxide from about 5 vol. % to about 35 vol. % based on a total volume of the carbon dioxide lean gas mixture 114. For example, the carbon dioxide lean gas mixture 114 may have a concentration of carbon dioxide from 5 vol. % to 35 vol. %, from 10 vol. % to 35 vol. %, from 15 vol. % to 35 vol. %, from 20 vol. % to 35 vol. %, from 30 vol. % to 35 vol. %, from 5 vol. % to 30 vol. %, from 5 vol. % to 25 vol. %, from 5 vol. % to 20 vol. %, from 5 vol. % to 15 vol. %, from 5 vol. % to 10 vol. %, or any combination or sub-set of these ranges.

The acid gas scrubber 110 may be the first stage of the system for scrubbing carbon dioxide from the carbon dioxide lean gas mixture 114. The acid gas scrubber 110 may remove one or more acid gas impurities, such as hydrogen sulfide and sulfur dioxide, which can deactivate the adsorbents of the pressure swing adsorption or temperature swing adsorption unit 120. The effective removal of the acid gas impurities is based upon their high water solubilities. For example, $H_2S$ is 2.3 times more soluble than $CO_2$ at 20° C. and 1 atm, and $SO_2$ is about 67 times more soluble than $CO_2$ at 20° C. and 1 atm. (G. W. C. Kaye and T. H. Laby, "Tables of Physical and Chemical Constants," 15th ed., Longman, N Y, 1986, p. 219) As described herein, "acid gas" may refer to gasses that form acids when mixed with water. For example, acid gas may include carbon dioxide, hydrogen sulfide, and sulfur dioxide. As described herein, "acid gas impurities," refer to acid gasses other than carbon dioxide. For example, the one or more acid gas impurities may include hydrogen sulfide, sulfur dioxide, and combinations of these, among other acid gasses. The acid gas scrubber 110 may be any suitable scrubbing apparatus. Suitable apparatuses for scrubbing acid gasses may include absorption columns or scrubbing towers. The acid gas scrubber 110 may be operable to remove at least a portion of the one or more acid gas impurities from the carbon dioxide lean gas mixture 114. In one or more embodiments, the acid gas scrubber 110 may be operable to remove at least 50%, at least 75%, at least 90%, at least 95%, or even at least 99% of the one or more acid gas impurities from the carbon dioxide lean gas mixture 114, based on the mass of the acid gas impurities.

The one or more acid gas impurities may be removed from the carbon dioxide lean gas mixture 114 when the carbon dioxide lean gas mixture 114 is contacted with water 112 in the acid gas scrubber 110. In one or more embodiments, the water 112 and carbon dioxide lean gas mixture 114 may contact each other in a counter current manner within the acid gas scrubber 110. The acid gas scrubber 110 may comprise media to enhance the contact between the water 112 and the carbon dioxide lean gas mixture 114. The media may be heat resistant and acid resistant.

For example, in embodiments, the acid gas scrubber 110 may include at least one vertical vessel, where the carbon dioxide lean gas mixture 114 interacts with and intimately intermingles with a stream of water 112 fed from the top of the vessel. To maximize contact between the carbon dioxide lean gas mixture 114 and water 112, the tower is packed with a filling or channels that create highly tortuous pathways. Consequently, water soluble gasses dissolve in the water whereas other insoluble gasses accumulate at the top of the vessel for collection and/or further treatment.

One purpose of the acid gas scrubber 110 is to facilitate an efficient mass transfer of the one or more acid gas impurities from a gas phase to a liquid phase. This is carried out through a contact tower filled with high specific surface area media (such as Tri-Mer® Tri-Packs® or Lantec Lan-pac® for example) and/or through a low profile tortous path air bubbler design, optimized specifically for this purpose. Providing maximum surface contact between the carbon dioxide lean gas mixture 114 and the water 112 by facilitating continuous formation of droplets throughout the packed bed results in high scrubbing efficiency and minimizes packing depth.

In one or more embodiments, a suitable residence time in the acid gas scrubber 110 may be from about 5 seconds to about 120 seconds, depending on the carbon dioxide lean gas mixture 114 composition and flow patterns. For example, the residence time in the acid gas scrubber 110 may be from 5 seconds to 120 seconds, from 15 seconds to 120 seconds, from 30 seconds to 120 seconds, from 45 seconds to 120 seconds, from 60 seconds to 120 seconds, from 75 seconds to 120 seconds, from 90 seconds to 120 seconds, from 105 seconds to 120 seconds, from 5 seconds to 105 seconds, from 5 seconds to 90 seconds, from 5 seconds to 75 seconds, from 5 seconds to 60 seconds, from 5 seconds to 45 seconds, from 5 seconds to 30 seconds, from 5 seconds to 15 seconds, or any combination or subset of these ranges.

In one or more embodiments, the temperature of the acid gas scrubber 110 may range from about 2° C. to about 90° C. under a pressure range of about 1 atmosphere (atm.) to about 30 atm. For example, temperature may range from 2° C. to 90° C., from 10° C. to 90° C., from 20° C. to 90° C., from 30° C. to 90° C., from 40° C. to 90° C., from 50° C. to 90° C., from 60° C. to 90° C., from 70° C. to 90° C., from 80° C. to 90° C., from 2° C. to 80° C., from 2° C. to 70° C., from 2° C. to 60° C., from 2° C. to 50° C., from 2° C. to 40° C., from 2° C. to 30° C., from 2° C. to 20° C., from 2° C. to 10° C., or any combination or subset of these ranges. Pressure may range from 1 atm. to 30 atm., from 5 atm. to 30 atm., from 10 atm. to 30 atm., from 15 atm. to 30 atm., from 20 atm. to 30 atm., from 25 atm. to 30 atm., from 1 atm. to 25 atm., from 1 atm. to 20 atm., from 1 atm. to 15 atm., from 1 atm. to 10 atm., from 1 atm. to 5 atm., or any combination or subset of these ranges. It should be noted that in some embodiments, the temperature may exceed 90° C. For example, in some embodiments, the temperature may reach 600° C. It is contemplated that the acid gas scrubber 110 may be designed to accommodate a wide range of temperatures and pressures.

Without intending to be bound by theory, it is believed that the one or more acid gas impurities are highly soluble in water, and that the one or more acid gas impurities within the carbon dioxide lean gas mixture 114 may dissolve into the water 112 when the water 112 and carbon dioxide lean gas mixture 114 are contacted within the acid gas scrubber 110. The one or more acid gas impurities dissolved within the water 112 may exit the acid gas scrubber 110 as an aqueous effluent 132.

In one or more embodiments, the water 112 may be freshwater, brackish water, saltwater, seawater, brine, formation water, or any other suitable water. Generally, the salinity of the water 112 may have minimal effect on the amount of acid gas that is soluble in the water. Additionally, the type of water 112 may be selected based on the location of the system for carbon capture. For example, seawater may be a suitable water source when the system for carbon capture is located near an ocean, sea, gulf, or similar body of water.

Scrubbing the one or more acid gas impurities from the carbon dioxide lean gas mixture 114 may result in a gas mixture 122. The gas mixture 122 may exit the acid gas scrubber 110. In one or more embodiments, the gas mixture 122 may comprise carbon dioxide and a reduced amount of the one or more acid gas impurities. The gas mixture 122 may comprise one or more acid gas impurities at a concentration that is within the tolerance of the pressure swing adsorption or temperature swing adsorption system 120. For the concentration of the one or more acid gas impurities to be within the tolerance of the pressure swing or temperature swing adsorption system 120, the concentration of the one or more acid gas impurities is low enough that the adsorbents of the pressure swing adsorption system or temperature swing adsorption system 120 are not poisoned by the gas mixture 122. In one or more embodiments, the gas mixture 122 may comprise carbon dioxide and be substantially free from the one or more acid gas impurities, for example, hydrogen sulfide and sulfur dioxide. As described herein, "substantially free from the one or more acid gas impurities" refers to a composition having a concentration of the one or more acid gas impurities, such as hydrogen sulfide and sulfur dioxide, of less than 5 vol. %, less than 3 vol. %, less than 1 vol. %, or even less than 0.1 vol. %. The gas mixture 122 may be passed to a pressure swing adsorption or temperature swing adsorption system 120. The gas mixture 122 may be passed to the pressure swing adsorption or temperature swing adsorption system 120 by any suitable means. For example, the gas mixture 122 may be passed to the pressure swing adsorption system 120 by a pump or a blower.

The pressure swing adsorption or temperature swing adsorption system 120 may be any suitable pressure swing adsorption or temperature swing adsorption system that uses the pressure or temperature dependent selective adsorption properties of materials such as activated carbon, silica, zeolites, and metal organic frameworks to separate gasses. The pressure swing adsorption or temperature swing adsorption system 120 may be operable to increase the concentration of carbon dioxide in the gas mixture 122 to produce a carbon dioxide enriched gas mixture 134. The pressure swing adsorption or temperature swing adsorption system 120 may utilize an adsorbent material to increase the concentration of carbon dioxide in the gas mixture 122. The adsorbent material may be any suitable material for increasing the concentration of carbon dioxide in the gas mixture 122. Without intending to be bound by theory, it is believed that suitable adsorbent materials for use in the pressure swing adsorption or temperature swing adsorption stage may be poisoned by the one or more acid gas impurities, such as hydrogen sulfide and sulfur dioxide. Poisoning of the adsorbent materials may reduce the effectiveness of the pressure swing adsorption or temperature swing adsorption system 120 for increasing the concentration of carbon dioxide in the gas stream. As such, in one or more embodiments, the one or more acid gas impurities, including hydrogen sulfide and sulfur dioxide, may be removed from the gas mixture 122 before the concentration of carbon dioxide is increased by the pressure swing adsorption or temperature swing adsorption system 120.

In one or more embodiments, the carbon dioxide enriched gas mixture 134 may have a greater concentration of carbon dioxide than the gas mixture 114. For example the carbon dioxide enriched gas mixture 134 may comprise at least 5%, at least 20%, at least 50%, at least 100%, at least 200%, at least 300%, at least 400%, at least 500%, at least 600%, at least 700%, at least 800%, at least 900%, or even at least 1000% more carbon dioxide than the gas mixture 122, based on the mass of the carbon dioxide. Without intending to be bound by theory, it is believed that increasing the concentration of carbon dioxide in the gas mixture may allow more carbon dioxide to be removed from the gas mixture in a subsequent scrubbing step. Carbon dioxide generally has a low solubility in water, for example, at 25° C. and 100 kPa the solubility of carbon dioxide in water is about 1.45 g/L. Accordingly, increasing the concentration of carbon dioxide in the gas mixture may increase the rate of mass transfer of carbon dioxide from the gas phase to the aqueous phase. Thus, concentrating the carbon dioxide in the gas mixture before scrubbing the carbon dioxide from the gas mixture may result in increased overall carbon capture.

The carbon dioxide enriched gas mixture 134 may be passed from the pressure swing adsorption or temperature swing adsorption system 120 to the carbon dioxide scrubber 130 by any suitable means, such as for example, a pump or blower. The carbon dioxide scrubber 130 may be any suitable apparatus for removing carbon dioxide from a gas stream. Suitable carbon dioxide scrubbers 130 may include pressurized vessels, such as scrubbing towers.

In one or more embodiments, the carbon dioxide scrubber 130 may contact the carbon dioxide enriched gas mixture 134 with the aqueous effluent 132 from the acid gas scrubber 110. The aqueous effluent 132 may be passed to the carbon dioxide scrubber by any suitable means, for example, the aqueous effluent 132 may be pumped from the acid gas scrubber 110 to the carbon dioxide scrubber 130.

Contacting the carbon dioxide enriched gas mixture 134 with the aqueous effluent 132 in the carbon dioxide scrubber 130 may allow carbon dioxide to be dissolved in the aqueous effluent 132 to form an acid gas enriched water 144 and stripped gas 142.

In one or more embodiments, the aqueous effluent 132 and carbon dioxide enriched gas mixture 134 may contact each other in a counter current manner within the carbon dioxide scrubber 130. The carbon dioxide scrubber 130 may comprise media to enhance the contact between the aqueous effluent 132 and the carbon dioxide enriched gas mixture 134. The media may be heat resistant and acid resistant.

For example, in embodiments, the carbon dioxide scrubber 130 may include at least one vertical pressurized vessel, where the carbon dioxide enriched gas mixture 134 interacts with and intimately intermingles with the aqueous effluent 132 fed from the top of the vessel. To maximize contact between the carbon dioxide enriched gas mixture 134 and the aqueous effluent 132, the tower is packed with a filling or channels that create highly tortuous pathways. Consequently, water soluble gasses dissolve in the water whereas other insoluble gasses accumulate at the top of the vessel for collection and/or further treatment.

One purpose of the carbon dioxide scrubber 130 is to facilitate an efficient mass transfer of carbon dioxide from a gas phase to a liquid phase. This is carried out through a contact tower filled with high specific surface area media (such as Tri-Mer® Tri-Packs® or Lantec Lanpac® for example) and/or through a low profile tortous path air bubbler design, optimized specifically for this purpose. Providing maximum surface contact between the carbon dioxide enriched gas mixture 134 and the aqueous effluent 132 by facilitating continuous formation of droplets throughout the packed bed results in high scrubbing efficiency and minimizes packing depth.

In one or more embodiments, a suitable residence time in the carbon dioxide scrubber 130 may be from about 5 to about 120 seconds, depending on the carbon dioxide enriched gas mixture 134 composition and flow patterns. For example, the residence time in the acid gas scrubber 110 may be from 5 seconds to 120 seconds, from 15 seconds to 120 seconds, from 30 seconds to 120 seconds, from 45 seconds to 120 seconds, from 60 seconds to 120 seconds, from 75 seconds to 120 seconds, from 90 seconds to 120 seconds, from 105 seconds to 120 seconds, from 5 seconds to 105 seconds, from 5 seconds to 90 seconds, from 5 seconds to 75 seconds, from 5 seconds to 60 seconds, from 5 seconds to 45 seconds, from 5 seconds to 30 seconds, from 5 seconds to 15 seconds, or any combination or subset of these ranges.

In one or more embodiments, the temperature of the carbon dioxide scrubber 130 may range from about 2° C. to about 90° C. under a pressure range of about 1 atmosphere (atm.) to about 30 atm. For example, temperature may range from 2° C. to 90° C., from 10° C. to 90° C., from 20° C. to 90° C., from 30° C. to 90° C., from 40° C. to 90° C., from 50° C. to 90° C., from 60° C. to 90° C., from 70° C. to 90° C., from 80° C. to 90° C., from 2° C. to 80° C., from 2° C. to 70° C., from 2° C. to 60° C., from 2° C. to 50° C., from 2° C. to 40° C., from 2° C. to 30° C., from 2° C. to 20° C., from 2° C. to 10° C., or any combination or subset of these ranges. Pressure may range from 1 atm. to 30 atm., from 5 atm. to 30 atm., from 10 atm. to 30 atm., from 15 atm. to 30 atm., from 20 atm. to 30 atm., from 25 atm. to 30 atm., from 1 atm. to 25 atm., from 1 atm. to 20 atm., from 1 atm. to 15 atm., from 1 atm. to 10 atm., from 1 atm. to 5 atm., or any combination or subset of these ranges. It should be noted that in some embodiments, the temperature may exceed 90° C. For example, in some embodiments, the temperature may reach 600° C. It is contemplated that the carbon dioxide scrubber 130 may be designed to accommodate a wide range of temperatures and pressures In one or more embodiments, from 40% to 90% of the carbon dioxide may be removed from the carbon dioxide enriched gas mixture 134 in the carbon dioxide scrubber 130. For example, the percentage of carbon dioxide removed from the carbon dioxide enriched gas mixture 134 may be from 40% to 90%, from 50% to 90%, from 60% to 90%, from 70% to 90%, from 80% to 90%, from 40% to 80%, from 40% to 70%, from 40% to 60%, from 40% to 50%, or any combination or subset of these ranges, based on the mass of the carbon dioxide. The stripped gas 142 may then be vented to the atmosphere from the carbon dioxide scrubber 130.

The acid gas enriched water 144 may be passed from the carbon dioxide scrubber 130 to reactive rock formation 150.

In the reactive rock formation 150, the carbon dioxide may be mineralized. As such, the carbon may be effectively captured and stored.

In one or more embodiments the reactive rock formation 150 may be a mafic or ultramafic rock formation. As described herein, the term "mafic" generally refers to a silicate mineral or igneous rock that is rich in magnesium and iron. Mafic mineral can be dark in color and rock-forming mafic minerals include olivine, pyroxene, amphibole, and biotite. Examples of mafic rocks include basalt, diabase, and gabbro, and examples of ultramafic rocks include dunite, peridotite, and pyroxenite. Chemically, mafic and ultramafic rocks can be enriched in iron magnesium and calcium.

Without intending to be bound by theory, the storage of carbon dioxide in reactive rocks is unique compared to conventional carbon capture and storage, because it relies mostly on rapidly proceeding chemical reactions that convert carbon dioxide gas to solids, rather than relying on physical storage of carbon dioxide itself over time. Carbon storage in basalts consumes significantly less energy than other carbon capture and storage systems and processes, does not require deep wells and does not require long-term reservoir monitoring.

In some embodiments, injecting the acid gas enriched water 144 into the reactive rock formation 150 avoids difficulties including compressing and maintaining carbon dioxide in a liquid state. Having carbon dioxide dissolved in an aqueous phase helps avoid the need for drilling deep disposal wells deeper than about 850 m below the surface, as is required in conventional carbon capture and storage. In other words, significantly lower pressures are needed to keep sufficient quantities of carbon dioxide dissolved in water, and injection zones can be as shallow as 350 vertical meters below surface for embodiments of the present disclosure.

Without intending to be bound by theory, immobilization of carbon dioxide as solid, stable carbonate minerals not only ensures permanent removal of carbon dioxide from the environment, but also precludes the need for sophisticated monitoring programs needed at conventional carbon capture and storage sites. Extreme tolerance of the present technology to the presence of up to about 40 mol. % of other water soluble waste gases such as hydrogen sulfide, which like carbon dioxide is rapidly and substantially completely mineralized in reactive rocks, also has important efficiency implications.

Without intending to be bound by theory, the acid gas enriched water 144 generally has higher density than ambient groundwater, in contrast to liquid carbon dioxide, which is less dense than reservoir water and thus buoyant. Consequently, when injected, the acid gas enriched water 144 will sink in the reservoir rather than move upwards, which in some embodiments eliminates the need of a caprock, an important geological feature of all conventional carbon capture and storage reservoirs. In embodiments of the present disclosure, injection and storage of carbon dioxide in basalts and other mafic or ultramafic rocks has no impact on the quality of groundwater residing in those lithologies. This is particularly important when such aquifers are used to supply drinking water or water for other purposes.

In one or more embodiments, components of the acid gas enriched water 144 react in situ with components of the mafic rock to precipitate products selected from the group consisting of: calcium carbonates, magnesium carbonates, iron carbonates, and combinations thereof. Still in other embodiments, the reservoir is between about 250 m and about 700 m, or is between about 400 m and about 500 m, below the surface and is between about 150° C. and about 280° C., or less. Temperatures in suitable reservoirs can be as low as about 30° C. In other embodiments, the reservoir is between about 700 m and about 2,200 m below the surface and is at a temperature of less than about 325° C.

While conventional carbon capture and storage relies predominantly on physical processes such as the injection and storage of single-phase liquid carbon dioxide in non-reactive rock reservoirs (e.g., sandstone, limestone), carbon sequestration in reactive formations, relies on the naturally occurring chemical reactions between carbon dioxide and mafic and ultramafic rocks to precipitate solid carbonates. Reactions include the following: first carbon dioxide dissolves in and reacts with water (either or both water supplied with the carbon dioxide gas at the surface or water present in situ in a mafic reservoir) to form a week carbonic acid as shown in Equations 1-3:

$$CO_2 + H_2O \leftrightarrow H_2CO_{3(aq)} \qquad \text{Eq. 1}$$

$$H_2CO_3 \leftrightarrow HCO_3^- + H^+ \qquad \text{Eq. 2}$$

$$HCO_3^- \leftrightarrow CO_3^{2-} + H^+ \qquad \text{Eq. 3}$$

Acidified water dissolves Ca, Fe, and Mg-rich silicate phases (minerals and/or volcanic glass) which results in the release of divalent metal ions in solution according to Equation 4:

$$(Mg,Fe,Ca)_2SiO_4 + 4H^+ \rightarrow 2(Mg,Fe,Ca)^{2+} + 2H_2O + SiO_{2(aq)} \qquad \text{Eq. 4}$$

$CO_3^{2-}$ formed during the reaction shown in Equation 3 reacts with the divalent metal cations leading to the precipitation of carbonate minerals as shown in Equation 5:

$$(Ca,Mg,Fe)^{2+} + CO_3^{2-} \rightarrow (Ca,Mg,Fe)CO_3 \qquad \text{Eq. 5}$$

Geochemical reaction-transport modeling demonstrates that mineral phases (for example calcite, siderite, and magnesite) will remain stable under prevailing subsurface conditions, hence safely removing carbon dioxide from the atmosphere for hundreds of thousands to millions of years. Other carbonate minerals include ankerite and Ca[Fe, Mg, Mn](CO_3)_2. Additionally, one or more embodiments described herein have extreme tolerance for other water soluble acid gas impurities (e.g. hydrogen sulfide, which is also mineralized as sulfides). This allows for simultaneous sequestering of multiple water soluble gas contaminants capable of forming stable mineral phases by reacting with basalts/mafics.

Without intending to be bound by theory, rates of basalt (and other mafic and ultramafic rocks) dissolution and mineral carbonation reactions can increase with increasing temperature, and thus higher temperature reactive rock reservoirs may be advantageous. Furthermore, deep reservoirs beyond about 850 m are not required because high pressures are not required to keep carbon dioxide in a pressurized or liquid state. An example suitable reservoir temperature is about 185° C., or for example between about 150° C. and about 280° C.

In one or more embodiments, injected carbon dioxide, either by itself or with other gases, may create an acidic environment with water near the injection well. Accordingly, the acidic fluids may remain undersaturated with respect to basaltic minerals and volcanic glass near the injection well. Undersaturation and acidity may lead to dissolution of host rock basalts in the vicinity of injection wells. Mineralization then mostly occurs at a distance away from the injection well (which allows continuous injection of carbon dioxide into the reservoir), after heat exchange and sufficient dissolution of host basaltic rock neutralizes the acidic water and saturates the formation water with respect to carbonate and sulfur minerals. Accordingly, carbon dioxide may be permanently sequestered in the reactive rock formation 150.

According to a first aspect of the present disclosure, a method for capturing carbon dioxide may include contacting a carbon dioxide lean gas mixture with water. One or more acid gas impurities may pass from the carbon dioxide lean gas mixture to the water to form a gas mixture and an aqueous effluent. The method may include passing the gas mixture to a pressure swing adsorption system or a temperature swing adsorption system to increase a concentration of carbon dioxide in the gas mixture to form a carbon dioxide enriched gas mixture. The method may include contacting the carbon dioxide enriched gas mixture with the aqueous effluent in a carbon dioxide scrubber. Carbon dioxide may pass from the carbon dioxide enriched gas mixture to the aqueous effluent to form a stripped gas and acid gas enriched water. The method may include passing the acid gas enriched water to a reactive rock formation. The one or more acid gas impurities and carbon dioxide may be mineralized and thereby permanently sequestered.

A second aspect of the present disclosure may include the first aspect, where the one or more acid gas impurities comprises hydrogen sulfide, sulfur dioxide, or both.

A third aspect of the present disclosure may include either of the first or second aspects, where a concentration of carbon dioxide in the carbon dioxide lean gas mixture is from 5 vol. % to 35 vol. % based on a total volume of the carbon dioxide lean gas mixture.

A fourth aspect of the present disclosure may include any of the first through third aspects, where the carbon dioxide lean gas mixture and water are contacted in a counter current manner in the acid gas scrubber.

A fifth aspect of the present disclosure may include any of the first through fourth aspects, where a residence time of the carbon dioxide lean gas mixture in the acid gas scrubber is from 5 seconds to 120 seconds.

A sixth aspect of the present disclosure may include any of the first through fifth aspects, where a temperature in the acid gas scrubber is from 2° C. to 90° C.

A seventh aspect of the present disclosure may include any of the first through sixth aspects, where a pressure in the acid gas scrubber is from 1 atm. to 30 atm.

An eighth aspect of the present disclosure may include any of the first through seventh aspects, where the acid gas scrubber comprises a vertical vessel.

A ninth aspect of the present disclosure may include any of the first through eighth aspects, where the acid gas scrubber comprises media, wherein the media is heat resistant and acid resistant.

A tenth aspect of the present disclosure may include any of the first through ninth aspects, where the acid gas scrubber removes at least 50% of the one or more acid gas impurities from the carbon dioxide lean gas mixture.

An eleventh aspect of the present disclosure may include any of the first through tenth aspects, where the gas mixture is substantially free from the one or more acid gas impurities.

A twelfth aspect of the present disclosure may include any of the first through eleventh aspects, where the pressure swing adsorption system or temperature swing adsorption system comprises an adsorbent material comprising carbon, silica, zeolites, metal organic frameworks, or combinations thereof.

A thirteenth aspect of the present disclosure may include any of the first through twelfth aspects, where the carbon dioxide enriched gas mixture comprises at least 50% more carbon dioxide than the gas mixture, based on the mass of the carbon dioxide.

A fourteenth aspect of the present disclosure may include any of the first through thirteenth aspects, where the carbon dioxide scrubber comprises a vertical pressurized vessel.

A fifteenth aspect of the present disclosure may include any of the first through fourteenth aspects, where a residence time of the acid-free gas mixture in the carbon dioxide scrubber is from 5 seconds to 120 seconds.

A sixteenth aspect of the present disclosure may include any of the first through fifteenth aspects, where the temperature in the carbon dioxide scrubber is from 2° C. to 90° C.

A seventeenth aspect of the present disclosure may include any of the first through sixteenth aspects, where the pressure in the carbon dioxide scrubber is from 1 atm. to 30 atm.

An eighteenth aspect of the present disclosure may include any of the first through seventeenth aspects, where from 40% to 90% of the carbon dioxide is removed from the carbon dioxide enriched gas mixture in the carbon dioxide scrubber, based on the mass of the carbon dioxide.

A nineteenth aspect of the present disclosure may include any of the first through eighteenth aspects, where the reactive rock formation comprises a mafic rock formation, an ultramafic rock formation, or both.

A twentieth aspect of the present disclosure may include any of the first through nineteenth aspects, where the reactive rock formation comprises basalt, diabase, gabbro, dunite, peridotite, pyroxenite, or combinations thereof.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

For the purposes of describing and defining the present disclosure it is noted that the terms "about" or "approximately" are utilized in this disclosure to represent the inherent degree of uncertainty that may be attributed to any quantitative comparison, value, measurement, or other representation. The terms "about" and/or "approximately" are also utilized in this disclosure to represent the degree by which a quantitative representation may vary from a stated reference without resulting in a change in the basic function of the subject matter at issue.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that where a first component is described as "comprising" a second component, it is contemplated that, in some embodiments, the first component "consists" or "consists essentially of" that second component. It should further be understood that where a first component is described as "comprising" a second component, it is contemplated that, in some embodiments, the first component comprises at least 10%, at least 20%, at least 30%, at least 40%, at least 50%, at least 60%, at least 70%, at least 80%, at least 90%, at least 95%, or even at least 99% that second component (where % can be weight %, molar %, or volume %).

Additionally, the term "consisting essentially of" is used in this disclosure to refer to quantitative values that do not materially affect the basic and novel characteristic(s) of the disclosure. For example, a chemical composition "consisting essentially" of a particular chemical constituent or group of chemical constituents should be understood to mean that the composition includes at least about 99.5% of a that particular chemical constituent or group of chemical constituents.

It should be understood that any two quantitative values assigned to a property may constitute a range of that property, and all combinations of ranges formed from all stated quantitative values of a given property are contemplated in this disclosure.

The invention claimed is:

1. A method for capturing carbon dioxide, the method comprising:
    contacting a carbon dioxide lean gas mixture with water in an acid gas scrubber, wherein one or more acid gas impurities pass from the carbon dioxide lean gas mixture to the water to form a gas mixture and an aqueous effluent;
    passing the gas mixture to a pressure swing adsorption system or a temperature swing adsorption system to increase a concentration of carbon dioxide in the gas mixture to form a carbon dioxide enriched gas mixture;
    contacting the carbon dioxide enriched gas mixture with the aqueous effluent in a carbon dioxide scrubber, wherein carbon dioxide passes from the carbon dioxide enriched gas mixture to the aqueous effluent to form a stripped gas and acid gas enriched water; and
    passing the acid gas enriched water to a reactive rock formation, wherein the one or more acid gas impurities and carbon dioxide are mineralized and thereby permanently sequestered.

2. The method of claim 1, wherein the one or more acid gas impurities comprises hydrogen sulfide, sulfur dioxide, or both.

3. The method of claim 1, wherein a concentration of carbon dioxide in the carbon dioxide lean gas mixture is from 5 vol. % to 35 vol. % based on a total volume of the carbon dioxide lean gas mixture.

4. The method of claim 1, wherein the carbon dioxide lean gas mixture and water are contacted in a counter current manner in the acid gas scrubber.

5. The method of claim 1, wherein a residence time of the carbon dioxide lean gas mixture in the acid gas scrubber is from 5 seconds to 120 seconds.

6. The method of claim 1, wherein a temperature in the acid gas scrubber is from 2° C. to 90° C.

7. The method of claim 1, wherein a pressure in the acid gas scrubber is from 1 atm. to 30 atm.

8. The method of claim 1, wherein the acid gas scrubber comprises a vertical vessel.

9. The method of claim 1, wherein the acid gas scrubber comprises media, wherein the media is heat resistant and acid resistant.

10. The method of claim 1, wherein the acid gas scrubber removes at least 50% of the one or more acid gas impurities from the carbon dioxide lean gas mixture.

11. The method of claim 1, wherein the gas mixture is substantially free from the one or more acid gas impurities.

12. The method of claim 1, wherein the pressure swing adsorption system or temperature swing adsorption system comprises an adsorbent material comprising carbon, silica, zeolites, metal organic frameworks, or combinations thereof.

13. The method of claim 1, wherein the carbon dioxide enriched gas mixture comprise s at least 50% more carbon dioxide than the gas mixture, based on the mass of the carbon dioxide.

14. The method of claim 1, wherein the carbon dioxide scrubber comprises a vertical pressurized vessel.

15. The method of claim 1, wherein a residence time of the acid-free gas mixture in the carbon dioxide scrubber is from 5 seconds to 120 seconds.

16. The method of claim 1, wherein the temperature in the carbon dioxide scrubber is from 2° C. to 90° C.

17. The method of claim 1, wherein the pressure in the carbon dioxide scrubber is from 1 atm. to 30 atm.

18. The method of claim 1, wherein from 40% to 90% of the carbon dioxide is removed from the carbon dioxide enriched gas mixture in the carbon dioxide scrubber, based on the mass of the carbon dioxide.

19. The method of claim 1, wherein the reactive rock formation comprises a mafic rock formation, an ultramafic rock formation, or both.

20. The method of claim 1, wherein the reactive rock formation comprises basalt, diabase, gabbro, dunite, peridotite, pyroxenite, or combinations thereof.

* * * * *